(12) United States Patent
Qi (10) Patent No.: US 11,614,728 B2
(45) Date of Patent: Mar. 28, 2023

(54) MACHINE TOOL MANAGEMENT SYSTEM THAT OBTAINS A NEXT MAINTENANCE PERIOD FROM A MAINTENANCE PERIOD MODEL AND A REFINEMENT ALGORITHM

(71) Applicant: FANUC Corporation, Yamanashi (JP)

(72) Inventor: Xiaoguang Qi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/941,544

(22) Filed: Jul. 29, 2020

(65) Prior Publication Data

US 2020/0356069 A1 Nov. 12, 2020

Related U.S. Application Data

(62) Division of application No. 15/089,827, filed on Apr. 4, 2016, now abandoned.

(30) Foreign Application Priority Data

Apr. 9, 2015 (JP) .............................. JP2015-079771

(51) Int. Cl.
*G05B 19/4065* (2006.01)
*H04L 67/12* (2022.01)

(52) U.S. Cl.
CPC .......... *G05B 19/4065* (2013.01); *H04L 67/12* (2013.01); *G05B 2219/32234* (2013.01); *G05B 2219/32422* (2013.01)

(58) Field of Classification Search
CPC ...... G05B 19/4065; G05B 2219/32234; G05B 2219/32422; G05B 2219/49206;
(Continued)

(56) References Cited

U.S. PATENT DOCUMENTS 5,444,640 A 8/1995 Hirai
6,110,214 A * 8/2000 Klimasauskas ...... G05B 13/027
700/30
(Continued)

FOREIGN PATENT DOCUMENTS

CN 1794124 A 6/2006
CN 1868666 A 11/2006
(Continued)

OTHER PUBLICATIONS

Definition of "Algorithm", Merriam-webster online dictionary, retrieved from the internet on Dec. 1, 2021 URL:<https://www.merriam-webster.com/dictionary/algorithm> (Year: 2021).*
(Continued)

*Primary Examiner* — Kenneth M Lo
*Assistant Examiner* — Jonathan Michael Skrzycki
(74) *Attorney, Agent, or Firm* — Hauptman Ham, LLP (57) ABSTRACT

A machine tool management system connects an external server and a large number of NC devices controlling the external server and respective machine tools through a network. The system collects several kinds of signal data from the NC device of each machine tool to the external server. In the system, the external server stores a maintenance period model and a refinement algorithm and obtains a next maintenance period from the maintenance period model.

2 Claims, 7 Drawing Sheets

(58) Field of Classification Search
CPC ........ G05B 2219/50129; G05B 19/042; H04L 67/12; G06Q 10/06
See application file for complete search history.

(56) References Cited

U.S. PATENT DOCUMENTS

| | | | | |
|---|---|---|---|---|
| 6,138,056 | A * | 10/2000 | Hardesty | G05B 19/4063 700/174 |
| 11,055,450 | B2 * | 7/2021 | Zyglowicz | G06Q 10/06311 |
| 2002/0013639 | A1 * | 1/2002 | Fujishima | B23Q 41/08 700/175 |
| 2004/0193307 | A1 * | 9/2004 | Fujishima | G05B 19/4065 700/177 |
| 2010/0042368 | A1 * | 2/2010 | Lovelace | G05B 19/4065 702/184 |
| 2013/0190921 | A1 | 7/2013 | Maekawa | |
| 2013/0223946 | A1 | 8/2013 | Yamamoto | |
| 2014/0076855 | A1 | 3/2014 | Takemoto | |
| 2014/0257530 | A1 | 9/2014 | Misoka | |
| 2015/0051726 | A1 | 2/2015 | Euhus | |

FOREIGN PATENT DOCUMENTS

| | | | | |
|---|---|---|---|---|
| CN | 103048968 | A | | 4/2013 |
| CN | 103217927 | A | | 7/2013 |
| DE | 102013216136 | B3 | | 3/2015 |
| JP | 47-84613 | A | | 3/1995 |
| JP | H8-215982 | A | | 8/1996 |
| JP | H1096616 | A | * | 4/1998 ............ B23Q 17/09 |
| JP | 2001-350510 | A | | 12/2001 |
| JP | 2002-244707 | A | | 8/2002 |
| JP | 2002366397 | A | * | 12/2002 ............ G01M 99/00 |
| JP | 2003-022107 | A | | 1/2003 |
| JP | 2004160564 | A | | 6/2004 |
| JP | 2004-334507 | A | | 11/2004 |
| JP | 2005-284712 | A | | 10/2005 |
| JP | 2006-184029 | A | | 7/2006 |
| JP | 2009-244061 | A | | 10/2009 |
| JP | 2012-240137 | A | | 12/2012 |
| JP | 2013-12100 | A | | 1/2013 |
| JP | 2013-215809 | A | | 10/2013 |
| JP | 2014-58017 | A | | 4/2014 |
| JP | 2014-174680 | A | | 9/2014 |
| JP | 2014-232413 | A | | 12/2014 |

OTHER PUBLICATIONS

Definition of "Refine", Merriam-webster online dictionary, retrieved from the internet on Dec. 1, 2021 URL:<https://www.merriam-webster.com/dictionary/refining> (Year: 2021).*

Saranga K. Abeygunawardane, "Adaptive Maintenance Policies for Aging Devices Using a Markov Decision Process", Aug. 2013, IEEE Transactions on Power Systems, vol. 28, No. 3; URL:<https://ieeexplore.ieee.org/stamp/stamp.jsp?tp=&arnumber=6419867> (Year: 2013).*

Yang et al., "Thermal error modeling and compensation for a high-speed motorized spindle", Nov. 1, 2014, International Journal of Advanced Manufacturing vol. 77 p. 1005-1017, Retrieved from the Internet URL<https://link.springer.eom/article/10.1007/s00170-014-6535-7> (Year: 2014), 13pp.

"estimate definition of estimate at dictionarycom" retrieved from the internet on May 17, 2019 [online] <URL: "https://www.dictionary.com/browse/estimate"> (Year: 2019), 7pp.

Office Action in JP Application No. 2017-147027, dated Oct. 23, 2018, 8pp.

Office Action in JP Application No. 2017-147029, dated Oct. 23, 2018, 5pp.

Office Action in JP Application No. 2015-079771, dated May 30, 2017, 7pp.

Hu Jiafu, "Mechanical fitter Q&A", Shanghai Science and Technology Press, p. 299, Jan. 31, 2012, 5pp.

Office Action in CN Application No. 201610221668.8, dated Dec. 24, 2021, 16pp.

* cited by examiner

| PARAMETER | EXPLANATION |
|---|---|
| $\{tm_1, tm_2, ...\}$ | ACCUMULATED TIME OF EACH SIGNAL ASSOCIATED WITH SHORTENING OF MAINTENANCE PART LIFE WITHIN MAINTENANCE PERIOD |
| $\{tm_1, tm_2, ...\}$ | ACCUMULATED TIME OF EACH SIGNAL ASSOCIATED WITH EXTENSION OF MAINTENANCE PART LIFE WITHIN MAINTENANCE PERIOD |
| $T$ | MAINTENANCE PERIOD ESTIMATED FOR NEXT TIME BY PROCESS |
| $T_0$ | MAINTENANCE PERIOD BEFORE EACH REFINEMENT ARITHMETIC PROCESSING, INITIAL SET VALUE IS PRESET |
| $T_{in}$ | MINIMUM MAINTENANCE PERIOD FOR REFERENCE |
| $P$ | TIME INTERVAL AND SAMPLING TIME OF PROCESSING, FROM LUBRICATION EXAMPLE |
| $K$ | FACTOR FOR DETERMINING LUBRICATION MAINTENANCE INFORMATION OF MAIN SPINDLE, FROM LUBRICATION EXAMPLE |
| $A_{in}$ | UPPER LIMIT FOR THE NUMBER OF ALARM OR WARNING MESSAGE REGARDING LUBRICATION FROM THE LAST LUBRICANT SUPPLY UP TO POINT IN TIME, FROM LUBRICATION EXAMPLE |
| $A_0$ | NUMBER OF ALARM OR WARNING MESSAGE REGARDING LUBRICATION FROM THE LAST LUBRICANT SUPPLY UP TO NOW |

MACHINE TOOL MANAGEMENT SYSTEM THAT OBTAINS A NEXT MAINTENANCE PERIOD FROM A MAINTENANCE PERIOD MODEL AND A REFINEMENT ALGORITHM

RELATED APPLICATIONS

The present application is a divisional of U.S. patent application Ser. No. 15/089,827, filed Apr. 4, 2016, which claims priority to Japanese Patent Application Number 2015-079771, filed Apr. 9, 2015, the disclosures of which are hereby incorporated by reference herein in their entireties.

BACKGROUND OF THE INVENTION

1. Field of the Invention

The present invention relates to a machine tool management system.

2. Description of the Related Art

In a conventional machine tool management system, an external server is connected to a plurality of machine tools though a network, the server collects data from each machine tool, and the system manages the machine tools by, for example, determining operating conditions of the tools using the server.

For example, Japanese Patent Laid-Open No. 2003-22107 discloses a technique in which information concerning a machining time and signal information are transferred to the external server that, and the server determines the machining information through computation. It is required for extending the working life of the machine tool to manage the inspection period and the life of its parts. In a maintenance and management system of conventional arts, data from the machine is collected and then the external server computes the data and determines the service conditions of the parts. For example, there is disclosed a method in which information concerning parts and signal information are transferred to an external server, and the server calculates the life and the maintenance timing of the parts though processing (refer to Japanese Patent Laid-Open No. 2005-284712, Japanese Patent Laid-Open No. 2002-244707, and Japanese Patent Laid-Open No. 2001-350510).

In the case of machining failure due to thermal distortion, however, the conventional system cannot know the production information because the system has no processing means that accurately determines the machining failure. In addition, in the maintenance and management system of the conventional art, inspection cycles of the parts need to be preset. For example, in a method disclosed in Japanese Patent Laid-Open No. 2005-284712, information concerning parts and signal information are transferred to an external server, and the server calculates an inspection schedule through processing.

Moreover, in the system of the conventional arts, while the inspection schedule is calculated, inspection cycle information of the parts is fixed and cannot be processed automatically even if it needs to be changed. Furthermore, in the system of the conventional arts, the server computes the collected data and then the system determines the service conditions of the parts, while actual service conditions might be different from the examination result of the maintenance computation. Also, the system may be unable to determine the actual service conditions only by the collected signal.

SUMMARY OF THE INVENTION

Thus, the present invention aims to provide an advanced machine tool management system in which a server collects several kinds of data from a plurality of machine tools and analyzes the data.

The present invention collects, as data that the external server collects from the machine tools, an estimated thermal distortion estimated within each machine tool and compares the estimated thermal distortion with data that has been stored in the external server in advance to thereby determine whether the tool is machining favorably. Thus, the present invention is capable of determining that the tool is machining unfavorably due to thermal distortion and knowing correct production status.

In the present invention, a maintenance period model and a refinement algorithm are stored in a computation unit in the external server in advance, the server collects several kinds of information from the machine tools and analyzes the collected data using the refinement algorithm, and the server can change a computational expression of the maintenance period model.

In the present invention, the server collects several kinds of data from the machine tools and analyzes the service conditions of parts, the server controls a robot having a detecting sensor attached thereto and moves the robot close to a malfunctioning part or a part that needs inspection, the detecting sensor examines the part, and then the service conditions of the part is determined.

In the present invention, the maintenance period model is refined automatically in accordance with the operating conditions of the machine, and thus the maintenance period is specified appropriately. When installing an external sensor, a computational expression of the maintenance period model can be incorporated by using signal information. This rationalizes the maintenance and inspection, and extends the life of mechanical parts.

According to the present invention, the actual service conditions of each part can be examined and the maintenance effect can be improved by the computation result of the collected data.

A machine tool management system according to the present invention connects an external server to a large number of NC devices through a network, the NC devices controlling respective machine tools, and collects an estimated thermal distortion obtained from the NC device of each machine tool to the external server. The external server collects the estimated thermal distortion from the NC device, obtains an absolute value of a difference between the estimated thermal distortion and pre-stored data, and determines whether the machine tool is machining a workpiece favorably based on a comparison between the obtained absolute value of the difference and a pre-specified permissible range.

A machine tool management system according to the present invention connects an external server to a large number of NC devices through a network, the NC devices controlling the server and respective machine tools, and collects an operating information obtained from the NC device of each machine tool to the external server. The external server includes storing means storing a maintenance period model and a refinement algorithm in advance, changing means changing a computational expression of the maintenance period model by the refinement algorithm, and computing means obtaining a next maintenance period from the maintenance period model.

The changing means changing the computational expression of the maintenance period model may be carried out manually or automatically.

The maintenance period model may be at least one of an inspection and maintenance period about a lubricant of the machine tool, an inspection and maintenance period about wear of a mechanism in the machine tool, an inspection and maintenance period about a machining tool of the machine tool, an inspection and maintenance period about an electrical component of the machine tool, and an inspection and maintenance period about a user-defined item of the machine tool.

A machine tool management system according to the present invention connects an external server, a large number of NC devices, and a robot to each other through a network, the NC devices controlling respective machine tools, the robot having one or more kinds of detecting sensors attached thereto, collects several kinds of signal data from the NC device of each machine tool to the external server, and determines whether a certain part of the machine tool is malfunctioning or needs inspection. When the system determines that the certain part is malfunctioning or needs inspection, the external server drives the robot connected to the network and moves the robot close to the part of the machine tool, the one or more kinds of detecting sensors attached to the robot examine the part, a detection signal from the sensors is transferred to the external server, and the system determines an actual service condition of the part of the machine tool.

The detecting sensors attached to the robot may be at least one of a visual sensor, a force sensor, and a temperature sensor.

The present invention, which is configured such that the server collects the several kinds of data from the machine tools and analyzes the data, provides an advanced machine tool management system.

BRIEF DESCRIPTION OF THE DRAWINGS

The above and other objects and features of the present invention will become apparent when the following description of embodiments is read with reference to the accompanying drawings, in which.

DETAILED DESCRIPTION OF THE PREFERRED EMBODIMENTS

Hereinafter, embodiments of the present invention will be described in conjunction with the drawings. A description will be given to an advanced machine tool management system configured such that a server collects several kinds of data from a plurality of machine tools and analyzes the data, taking cases of collecting an estimated thermal distortion and operating information (operating data) from the machine tools and information from a sensor (data detected by the sensor) as the data to be collected from the machine tools. The management system according to the present invention involves at least one of the estimated thermal distortion, the operating information, and the information from the sensor.

<Thermal Distortion Compensation>

Figure 1:
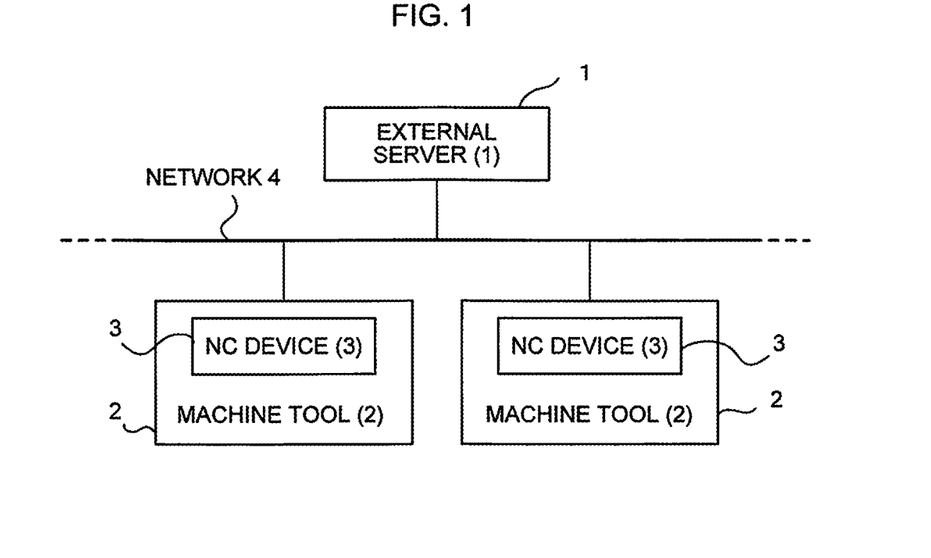
FIG. 1 is a diagram showing an embodiment of a machine tool management system according to the present invention.

FIG. 1 is a diagram showing an embodiment of the machine tool management system according to the present invention.

The machine tool management system is a system connecting an external server 1 with a large number of NC devices (numerical controllers) 3 controlling the external server 1 and respective machine tools 2 through a network 4. The external server 1 collects several kinds of signal data from the NC device 3 of each machine tool. In the system, the external server 1 collects an estimated thermal distortion from each NC device 3 and determines machining failure based on a comparison with pre-stored data. Examples of the estimated thermal distortion include an estimated thermal distortion of a tool tip portion.

Figure 2:
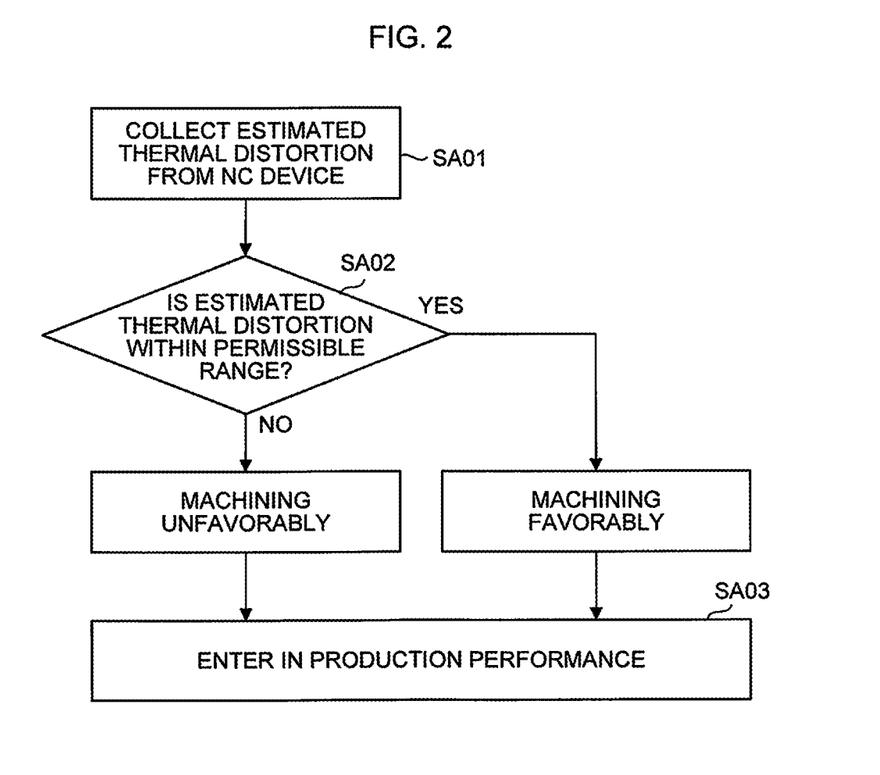
FIG. 2 is a flowchart of the machine tool management system according to the present invention.

FIG. 2 is a flowchart of the machine tool management system according to the present invention.

(SA01)

The external server 1 collects a tool tip portion estimated thermal distortion in the Z-axis direction {A1, A2, ... } from the NC device 3 for the Z-axis direction, the direction of one drive shaft of the machine tool 2, at a specified sampling time {T1, T2, ... }.

(SA02)

Figure 3:
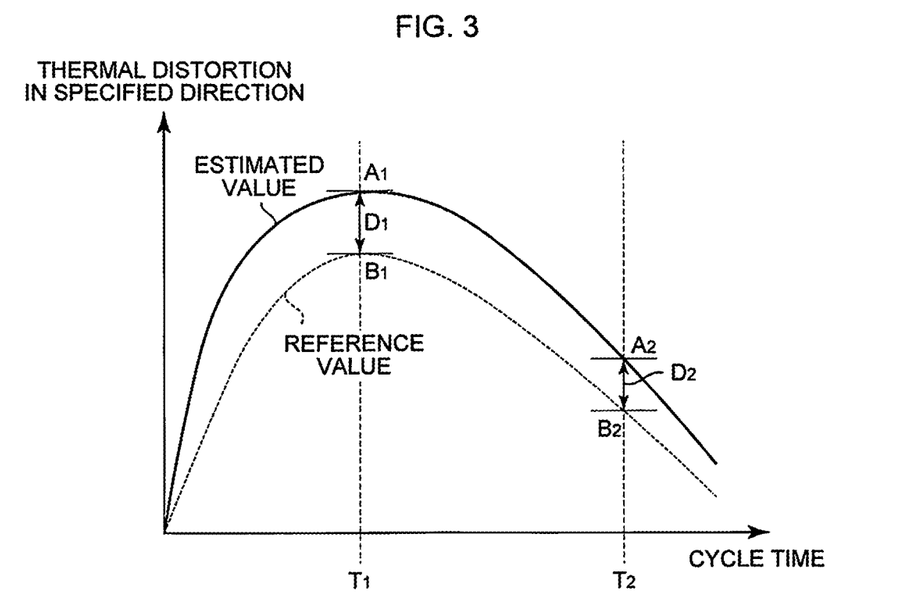
FIG. 3 is a graph for explaining a comparison method in step S02.

FIG. 3 is a graph for explaining a comparison method in step S02. As shown in FIG. 3, when the tool is machining favorably at the pre-stored specified sampling time {T1, T2, ... }, the external server 1 compares the estimated thermal distortion with a Z-axis direction reference distortion {B1, B2, ... } to obtain a difference between them and determines whether the absolute value of the obtained difference is within a permissible range {D1, D2, ... }. When the absolute value of the difference is within the permissible range, the server determines that the tool is machining well, and when it exceeds the permissible range, the server determines that the tool is machining unfavorably.

$|A-B| \leq D$ machining poor
$|A-B| < D$ machining well

The above {B1, B2, ... } and {D1, D2, ... } are stored in advance in storing means of the external server 1 for each machining workpiece. A plurality of data pools need to be prepared for plural kinds of machining workpieces and plural axis directions of the machining tool.

(SA03)

The result of the determination in step SA02 is entered in production performance of the management system for the machine tools 2.

<Maintenance Period>

Figure 4:
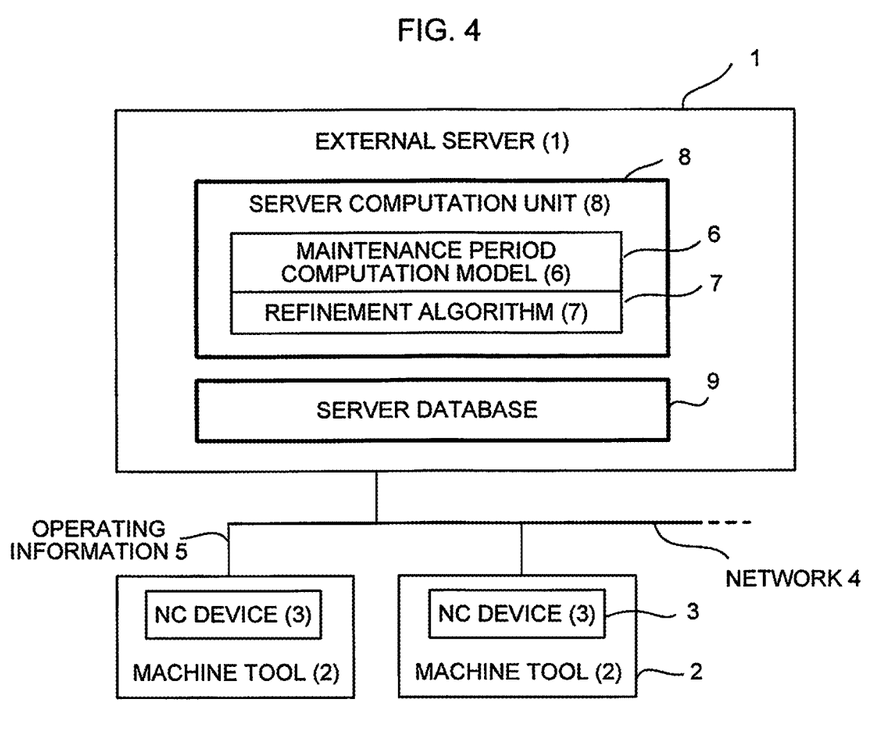
FIG. 4 is a diagram showing another embodiment of the machine tool management system according to the present invention.
Figure 5:
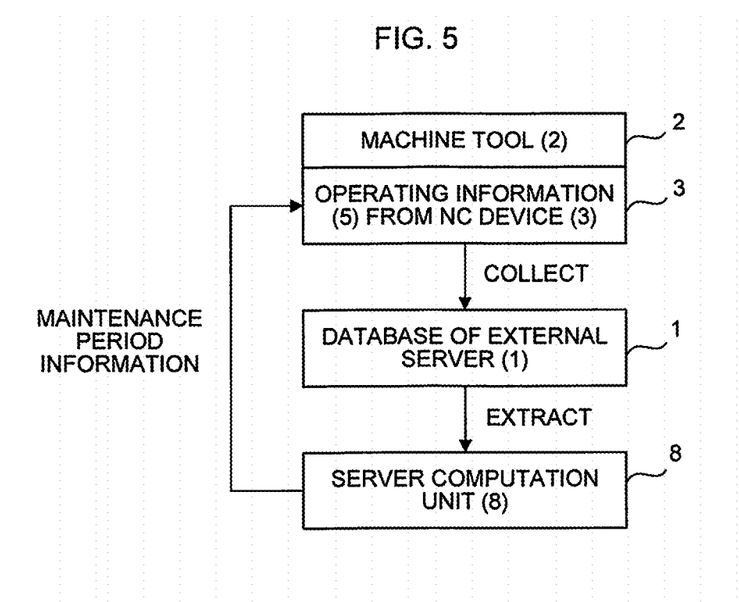
FIG. 5 shows a flow of information processing.
Figure 6:
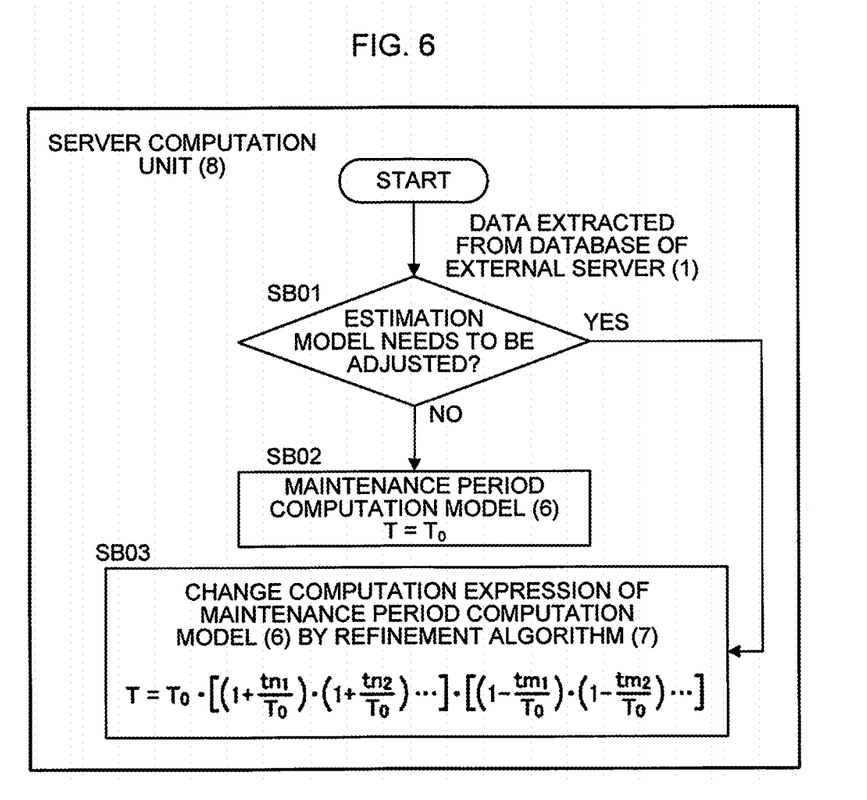
FIG. 6 shows a flowchart of a process for changing a model in a server computation unit.

FIG. 4 is a diagram showing another embodiment of the machine tool management system according to the present invention. FIGS. 5 and 6 each show a flow of information processing. An external server 1 is installed and connected through a network 4 to a large number of NC devices 3 controlling the external server 1 and respective machine tools 2. The management system of the machine tools 2 collects operating information 5 obtained from the NC device 3 of each machine tool 2 to the external server 1. The operating information 5 collected to the external server 1 is stored in a server database (storing means) 9.

As shown in FIG. 4, the external server 1 stores in advance a maintenance period computation model 6 and a refinement algorithm 7 in a server computation unit 8. The server computation unit 8 computes a maintenance period using the maintenance period computation model 6 and determines a next maintenance period. The refinement algorithm 7 analyzes the operating information 5 all the time. The management system of the machine tools 2 changes the computational expression of the maintenance period computation model 6 with the refinement algorithm 7.

FIG. 6 shows a flowchart of a process for changing the model in the server computation unit.

(SB01)

A determination is made about whether the estimation model needs to be adjusted. If the model needs to be adjusted, the process proceeds to step SB03, and if not, the process proceeds to step SB02.

(SB02)

The maintenance period is computed from the maintenance period computation model 6. An initial set value of the maintenance period model is $T=T_0$.

(SB03)

The computational expression of the maintenance period computation model 6 is changed by the refinement algorithm 7.

Now, a description will be given to the change of the computational expression of the maintenance period computation model 6 by the refinement algorithm 7. Signals that have effects on a maintenance part (the operating information 5 of each machine tool) are transferred to the external server 1. Among the signals that have effects on the maintenance part, signals associated with shortening of a maintenance part life are $\{M\}=\{m1, m2, \ldots\}$, and accumulated time of each corresponding signal within the maintenance period is $\{tm_1, tm_2, \ldots\}$.

Signals associated with extension of a maintenance part life are $\{N\}=\{n1, n2, \ldots\}$, and accumulated time of each corresponding signal within the maintenance period is $\{tn_1, tn_2, \ldots\}$. The initial set value of the maintenance period model is $T=T_0$, and the maintenance period computation model 6 is expressed by the refinement algorithm 7 in mathematical expression 1.

$$T = T_0 \cdot \left[\left(1 + \frac{tm_1}{T_0}\right) \cdot \left(1 + \frac{tm_2}{T_0}\right) \cdots \right] \cdot \left[\left(1 - \frac{tm_1}{T_0}\right) \cdot \left(1 - \frac{tm_2}{T_0}\right) \cdots \right]$$ [Expression 1]

That is, the maintenance period computation model 6 is changed such that the maintenance period is extended by the signals associated with extension of a maintenance part life and shortened by the signals associated with shortening of a maintenance part life. The maintenance period of the maintenance period computation model 6 is made longer or shorter than the initial set value $T_0$ by the refinement algorithm 7. Because there is a possibility of malfunctioning in the case of an extremely short or long maintenance period, an upper and/or lower limit may be set on the maintenance period. The operator may be warned by an alarm if the maintenance period exceeds the set range. For example, a minimum maintenance period $T_{in}$ may be set in the server computation unit 8.

Figure 7:
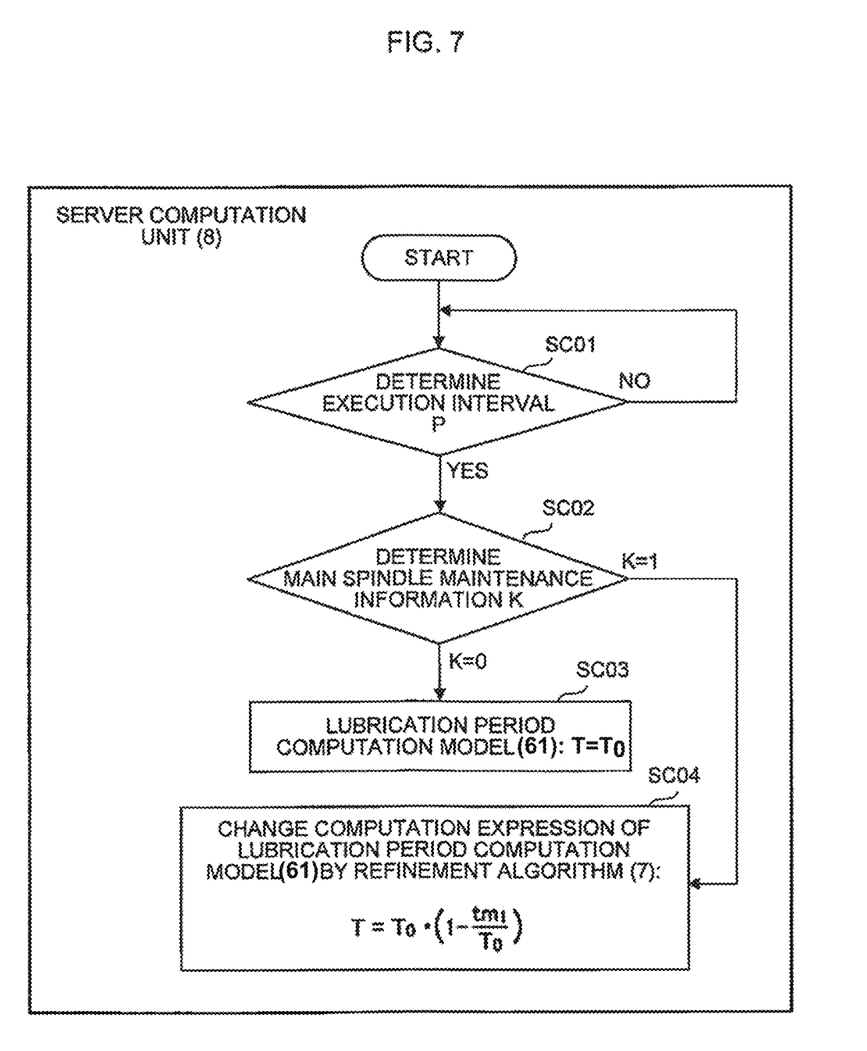
FIG. 7 shows a flowchart of a process of lubrication maintenance.

In FIG. 6, SB01 is carried out automatically or manually. FIG. 7 shows a flowchart of an example computation unit in the present invention. In the example, the operating information 5 is a main spindle high-speed rotation signal, and the maintenance period is a period for maintenance and inspection of a lubricant. The high-speed rotation is defined in advance to be, for example, 80% of a maximum rotation speed. An accumulated elapsed time $tm_1$ of main spindle rotation at 80% of the maximum rotation speed within the last lubrication period $T_0$ is set to be associated with lack of lubrication during the high-speed rotation in advance. Although not shown in FIG. 7, the temperature of the main spindle is measured, and an accumulated time $tn_1$ at or under the pre-set temperature is set to be associated with smooth lubrication and extension of maintenance period. Examples of parameters for extending the maintenance period include an amount of time the rotation of the main spindle is stopped. The change of the computational expression by the refinement algorithm 7 is expressed in mathematical expression 2.

$$T = T_0 \cdot \left(1 + \frac{tm_1}{T_0}\right)$$ [Expression 2]

Hereinafter, the process will be described following each step.

(SC01)

The process of the computation unit is executed at a specified time interval and sampling time P.

The sampling time P is preset by the external server 1.

(SC02)

Main spindle maintenance information K is a parameter set by the external server 1.

To be specific, the external server 1 analyzes the collected information (the operating information 5) as follows.

Pre-set Parameter $A_{in}$

A parameter $A_{in}$ denotes a maximum number of alarms or warning messages regarding the lubrication from the last lubricant supply up to the point in time. The initial set value $T_0$ of the lubrication maintenance period is set the parameter $A_{in}$.

Then, the number of the alarms or the warning messages regarding the lubrication from the last lubricant supply up to now is denoted by $A_0$.

If $A_0 < A_{in}$, it is determined that the lubrication is appropriate, and the parameter K is set to 0.

If $A_0 > A_{in}$, it is determined that lubricant supply period needs to be refined, and the parameter K is set to 1.

As described above, the value of the parameter K is set automatically. Alternatively, the user may set the lubrication state to the parameter K manually.

Thus, the process proceeds to the next step in accordance with the value of the parameter K.

(SC03)

If K=0, the lubrication period computation model 61 is used.

Because the current estimation is appropriate, there is no need to change the lubrication period, that is, $T=T_0$.

(SC04)

If K=1, the computational expression of the lubrication period computation model 61, which is the maintenance period computation model 61, following the refinement algorithm 7 (refer to mathematical expression 2).

Figure 8:
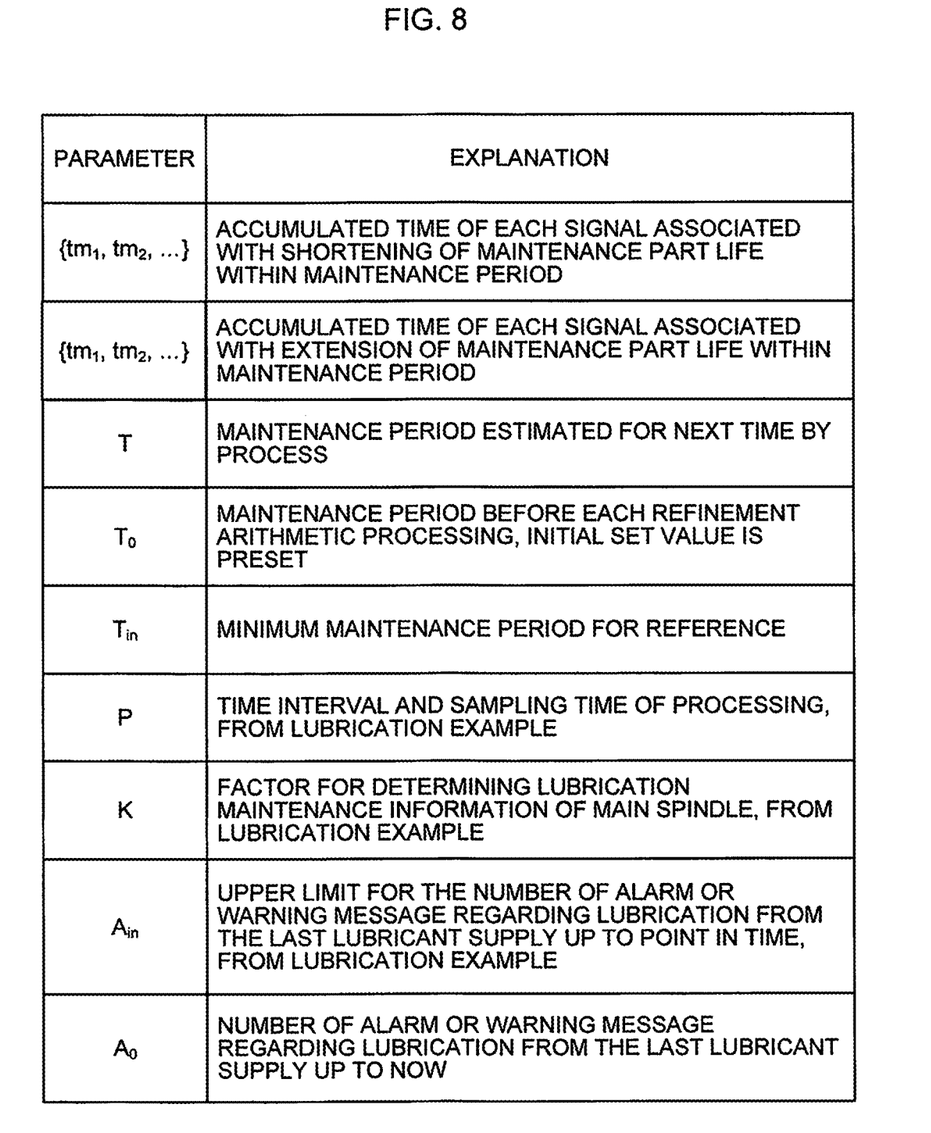
FIG. 8 shows a list of parameters.

FIG. 8 shows the parameters used in the flowchart shown in FIG. 7 in a list.

The maintenance period model is at least one of inspection and maintenance periods about the lubricant of the machine tool, about wear of a mechanism in the machine tool, about the machining tool of the machine tool, about an electrical component of the machine tool, and about a user-defined item of the machine tool.

<Robot with Sensor>

Figure 9:
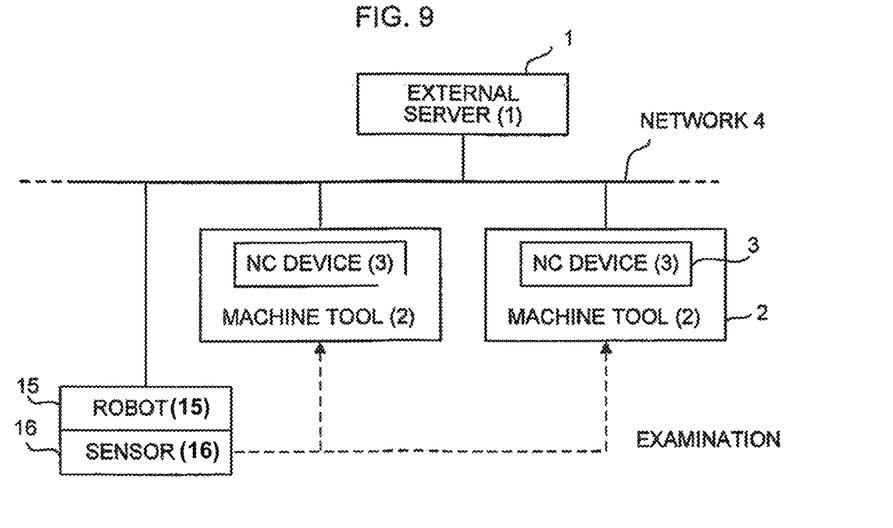
FIG. 9 is a diagram showing a system according to the present invention provided with a robot.

FIG. 9 is a diagram showing a system according to the present invention provided with a robot. The machine tool management system is formed by installing an external server 1 and connecting the server through a network 4 to a large number of NC devices 3 controlling the external server 1 and respective machine tools 2, and a robot 15 having several kinds of detecting sensors 16 and 17 mounted thereto. Several kinds of signal data from the NC device 3 of each machine tool 2 is collected to the external server 1, and the system determines whether a certain part is malfunctioning or needs inspection.

In the machine tool management system, when a certain part is malfunctioning or needs inspection, the external server 1 drives the robot 15 connected to the network 4 and moves the robot 15 close to the malfunctioning part, or the part that needs inspection, of the machine tool 2, the sensors 16 and 17 attached to the robot 15 examines the part, and then a detection signal is transferred to the external server 1. The machine tool management system is capable of determining the actual service conditions of the part.

Figure 10:
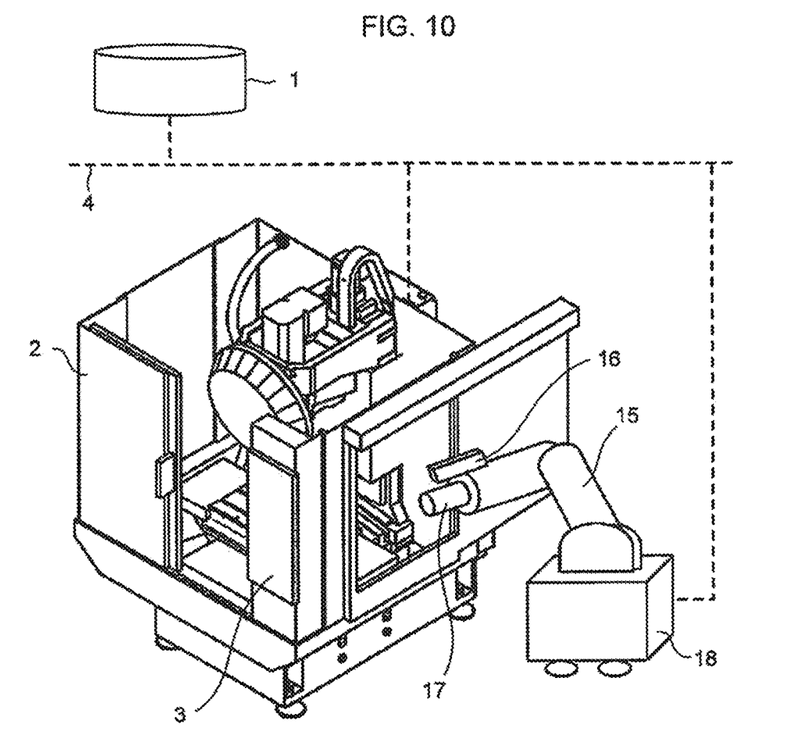
FIG. 10 illustrates an embodiment of the system according to the present invention provided with a robot.

FIG. 10 illustrates an embodiment of the system according to the present invention provided with a robot. The system of the embodiment is a machine tool maintenance and management system using a robot having a visual sensor and a force sensor. The robot 15 is movable by means of a robot moving device 18. The robot 15 is provided with a visual sensor 16 and a force sensor 17. These sensors enable the inspection of parts.

Figure 11:
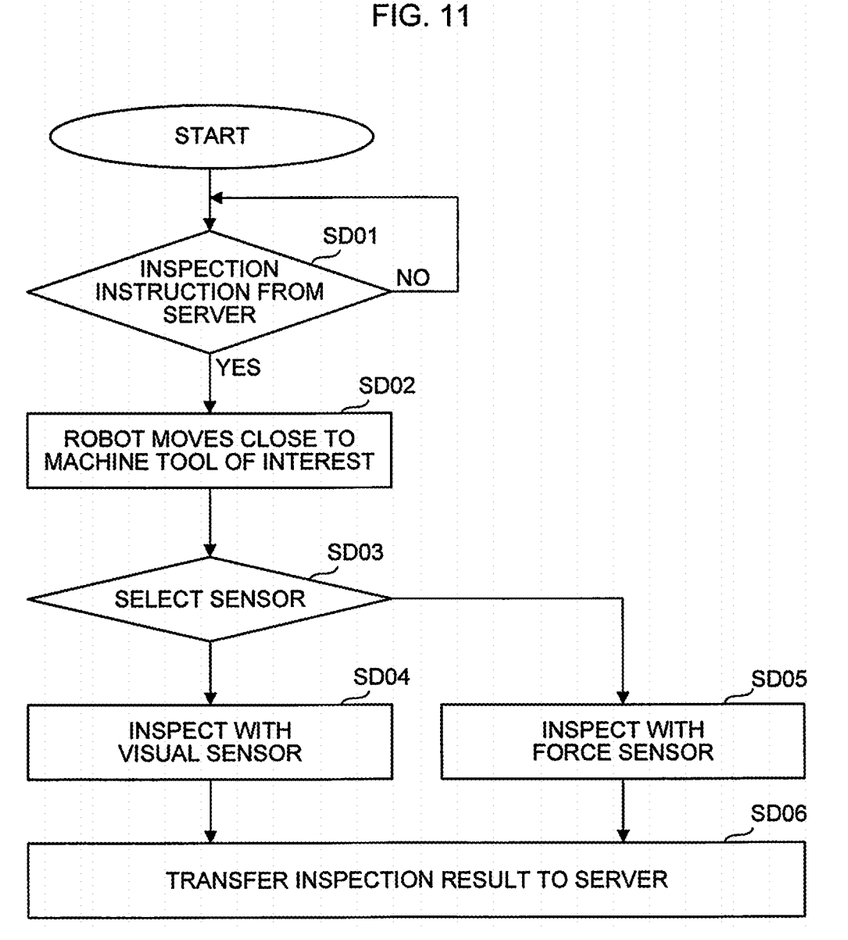
FIG. 11 is a flowchart of a process in an embodiment of the system according to the present invention provided with the robot.

FIG. 11 is a flowchart of a process in an embodiment of the system according to the present invention provided with a robot.

(SD01)

The external server 1 instructs the robot 15 to perform inspection. The robot 15 determines whether it has received an inspection instruction from the external server 1, and if the robot 15 determines that it has received an inspection instruction (YES), the process proceeds to step SD02, and if not (NO), the robot 15 waits for an inspection instruction.

(SD02)

If the robot 15 has received an inspection instruction, the robot 15 moves close to the machine tool of interest.

(SD03)

The robot 15 selects the visual sensor and/or the force sensor suitable for the part that needs inspection.

(SD04)

For example, when the machining tool is malfunctioning, the visual sensor 16 inspects wear and damage of the tool of interest or the force sensor 17 touches the tool and inspects vibrations of the tool (SD05).

(SD06)

The inspection result is transferred to the external server 1 to complete the process.

The embodiments of the present invention have been described above, while the present invention is not limited to the embodiments but may be changed appropriately to be embodied in other forms.

The invention claimed is:

1. A machine tool management system, comprising:
an external server; and
a plurality of numerical controller (NC) devices connected to the external server through a network, the NC devices controlling respective machine tools,
wherein the external server is configured to collect operating information obtained from the NC device of each machine tool, and comprises:
storing unit storing a maintenance period model and a refinement algorithm in advance;
changing unit changing a computational expression of the maintenance period model by the refinement algorithm; and
computing unit obtaining a next maintenance period from the maintenance period model,
wherein a maintenance of at least one of the machine tools is executed in accordance with the next maintenance period obtained by the external server, and
wherein an initial set value of the maintenance period model is $T=T_0$, and the next maintenance period is expressed by the refinement algorithm:

$$T=T_0 \cdot [(1+tn_1/T_0) \cdot (1+tn_2/T_0) \cdots (1+tn_i/T_0)] \cdot [(1-tm_1/T_0) \cdot (1+tm_2/T_0) \cdots (1+tm_j/T_0)]$$

m1, m2 ... $m_j$ denote signals associated with shortening of a maintenance part life,
tm1, tm2 $tm_j$ denote accumulated time of each corresponding signal m1, m2 ... $m_j$ within the maintenance period,
n1, n2 ... $n_i$ denote signals associated with extension of the maintenance part life,
tn1, tn2 $tn_i$ denote accumulated time of each corresponding signal n1, n2 ... $n_i$ within the maintenance period, and
i and j are positive integers greater than 1.

2. The machine tool management system according to claim 1, wherein the external server is configured to control a robot to perform inspection of at least one of the machine tools in accordance with the next maintenance period obtained by the external server.

* * * * *